(12) United States Patent
Sokolov et al.

(10) Patent No.: US 9,749,299 B1
(45) Date of Patent: Aug. 29, 2017

(54) SYSTEMS AND METHODS FOR IMAGE-BASED ENCRYPTION OF CLOUD DATA

(71) Applicant: Symantec Corporation, Mountain View, CA (US)

(72) Inventors: Ilya Sokolov, Boston, MA (US); Lei Gu, Benford, MA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 152 days.

(21) Appl. No.: 14/641,957

(22) Filed: Mar. 9, 2015

(51) Int. Cl.
*H04L 9/32* (2006.01)
*H04L 29/06* (2006.01)
*H04L 9/14* (2006.01)

(52) U.S. Cl.
CPC .......... *H04L 63/0428* (2013.01); *H04L 9/14* (2013.01); *H04L 2209/24* (2013.01)

(58) Field of Classification Search
CPC .... H04L 63/0428; H04L 9/14; H04L 2209/24
USPC ........................................................ 713/168
See application file for complete search history.

(56) References Cited

U.S. PATENT DOCUMENTS

| 8,687,812 | B2 * | 4/2014 | Steele | H04L 9/0869 380/277 |
| 2010/0103193 | A1 * | 4/2010 | Abe | H04N 5/775 345/620 |
| 2013/0111217 | A1 * | 5/2013 | Kopasz | G06F 21/6245 713/189 |
| 2015/0036807 | A1 * | 2/2015 | Jai | H04M 3/42221 379/88.17 |
| 2016/0127383 | A1 * | 5/2016 | Childs | G06F 17/30876 726/30 |

OTHER PUBLICATIONS

Walter Bogorad; Systems and Methods for Secure Hybrid Third-Party Data Storage; U.S. Appl. No. 14/271,967, filed May 7, 2014.
"Norton Identity Safe", https://identitysafe.norton.com/, as accessed Jan. 16, 2015, Symantec Corporation, (on or before May 5, 2012).
"Norton Online Backup", https://nobu.backup.com/session/new, as accessed Jan. 16, 2015, Symantec Corporation, (on or before Jan. 28, 2011).

(Continued)

*Primary Examiner* — Kambiz Zand
*Assistant Examiner* — Aubrey Wyszynski
(74) *Attorney, Agent, or Firm* — FisherBroyles LLP

(57) ABSTRACT

The disclosed computer-implemented method for image-based encryption of cloud data may include (1) identifying a user account for a cloud data store, wherein the cloud data store stores at least one secret to be secured by encryption on behalf of the user account, (2) receiving an image file to be used at least in part to generate a cryptographic element to be used for encrypting the secret, the cryptographic element capable of being re-created when the image file is provided again at a later time, (3) using at least one cryptographic function, generating the cryptographic element based at least in part on the image file, and (4) securing the secret by encrypting the secret using the cryptographic element. Various other methods, systems, and computer-readable media are also disclosed.

20 Claims, 10 Drawing Sheets

(56) References Cited

OTHER PUBLICATIONS

"About the Key Management Service (KMS)", http://www.symantec.com/business/support/index?page=content&id=HOWTO89819, as accessed Jan. 16, 2015, Symantec Corporation, (Oct. 1, 2013).
"Dropbox", https://www.dropbox.com/, as accessed Jan. 16, 2015, (Dec. 26, 1996).
"Facebook", https://www.facebook.com/, as accessed Jan. 16, 2015, (Dec. 12, 1998).

* cited by examiner

SYSTEMS AND METHODS FOR IMAGE-BASED ENCRYPTION OF CLOUD DATA

BACKGROUND

A significant trend in recent years has been the movement of data and services to cloud-based systems. Increasingly, individuals and organizations rely on cloud-based data storage, even for sensitive data. Unfortunately, as demonstrated by some widely reported leaks of sensitive data stored in cloud services, security measures taken by cloud service providers may not adequately protect data.

Data stored in cloud services is often vulnerable at a number of points. Access to the user's cloud service account may be accessible to anyone who can obtain or guess the username and password for the account. System administrators or data backup services employed by the cloud service may be able to access and transmit user data to unauthorized recipients. And, while the cloud service may store user data in encrypted form, the cryptographic key needed to decrypt the data may be still accessible to system administrators of the cloud service.

Since most security practices used by cloud services typically remain confidential, users may have only the reputation of the cloud service to assure them that proper security measures have been implemented. Some large organizations try to ensure that their sensitive data is being adequately protected by operating their own cloud storage service. Even so, these organizations still rely on the competence and integrity of the system administrators they employ to ensure that data security policies are properly implemented.

Finally, even when the user protects their account with a strong password that is kept inaccessible to others and the cloud service has implemented best data security practices, the cloud service may be legally required in some circumstances to turn over cryptographic keys to government entities in the country where cloud service facilities are located. Accordingly, the instant disclosure identifies and addresses a need for additional and improved systems and methods for image-based encryption of cloud data.

SUMMARY

As will be described in greater detail below, the instant disclosure describes various systems and methods for image-based encryption of cloud data by encrypting cloud data in a user account using a cryptographic key based on an image file that the user intends to keep indefinitely. Given a thumbnail or description of the image, the user may be able to remember the image file that was provided and be able to provide the image file again to re-create the cryptographic key needed to decrypt the cloud data.

In one example, a computer-implemented method for image-based encryption of cloud data may include (1) identifying a user account for a cloud data store, where the cloud data store stores one or more secrets to be secured by encryption on behalf of the user account, (2) receiving an image file to be used at least partly to generate a cryptographic element for encrypting the secret, with the cryptographic element capable of being re-created when the image file is provided again at a later time, (3) using at least one cryptographic function, generating the cryptographic element based on the image file, and (4) securing the secret by encrypting the secret using the cryptographic element.

In one embodiment, the cryptographic element may include a public encryption key stored with the user account in the cloud data store for encrypting the secret and a private decryption key to be re-created upon receiving the image file when the secret is to be decrypted. In one embodiment, the secret may include a file encrypted using the cryptographic element on behalf of the user account, with the file to be decrypted at a later time when the image file is provided again to re-create the cryptographic element.

In one embodiment, the secret may include a master cryptographic element where (1) the master cryptographic element may include a private decryption key for decrypting files in the user account that were encrypted using a public encryption key, (2) the master cryptographic element is encrypted using the cryptographic element on behalf of the user account, and (3) the master cryptographic element is to be decrypted at a later time when the image file provided again to re-create the cryptographic element to decrypt the master cryptographic element. In some examples, receiving the image file may include receiving, from a user of the user account for the cloud data store, a link to the image file in a user account that is for a social media service and that is also controlled by the user. In some examples, generating the cryptographic element may include creating a description of content within an image rendered from the image file. In some examples, generating the cryptographic element may include selecting at least one metadata tag of the image file.

In some examples, the computer-implemented method may further include storing a copy of the image file, modified so as not to be usable to re-create the cryptographic element, to be used as a prompt to remind the user of the user account of the image file to be provided to re-create the cryptographic element. In one embodiment, the user provides the image file in response to the prompt at least in part to authenticate the user to gain access to the user account. In one embodiment, the user provides the image file after authenticating to the user account to re-create the cryptographic element so as to recover the ability to decrypt the secret. In one embodiment, the prompt may include the modified image file displayed with at least one other image, so as to test the user's ability to identify the correct image file to be provided.

In some examples, the computer-implemented method may further include providing the prompt to remind the user of the user account of the image file to be provided to re-create the cryptographic element, and the reminder may include (1) the modified copy of the image file, (2) the description of content within an image rendered from the image file, and/or (3) the text representing at least one metadata tag of the image file. In one embodiment, the image file may include a video file.

In one embodiment, a system for implementing the above-described method may include several modules stored in memory, such as (1) an identification module that identifies a user account for a cloud data store, where the cloud data store stores one or more secrets to be secured by encryption on behalf of the user account, (2) an image module that receives an image file to be used at least partly to generate a cryptographic element for encrypting the secret, with the cryptographic element capable of being re-created when the image file is provided again at a later time, (3) a key generation module that uses at least one cryptographic function to generate the cryptographic element based at least in part on the image file, and (4) an encryption module that secures the secret by encrypting the secret using the cryptographic element. The system may also include at least one physical processor configured to execute the identification module, the image module, the key generation module, and the encryption module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a user account for a cloud data store, where the cloud data store stores one or more secrets to be secured by encryption on behalf of the user account, (2) receive an image file to be used at least partly to generate a cryptographic element to be used for encrypting the secret, with the cryptographic element capable of being re-created when the image file is provided again at a later time, (3) using at least one cryptographic function, generate the cryptographic element based at least partly on the image file, and (4) secure the secret by encrypting the secret using the cryptographic element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
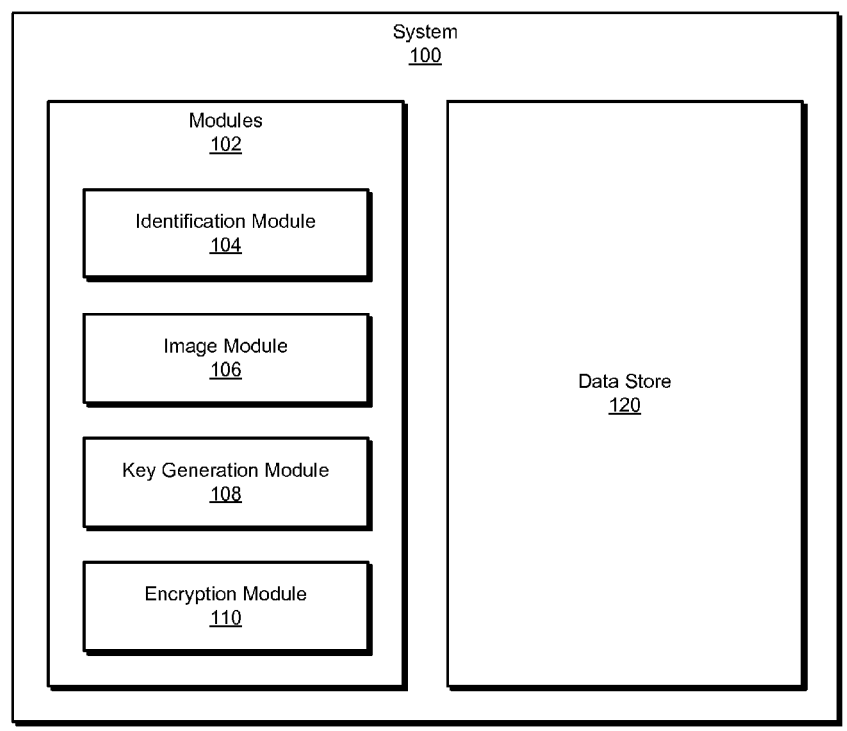
FIG. 1 is a block diagram of an exemplary system for image-based encryption of cloud data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for image-based encryption of cloud data. As will be explained in greater detail below, systems and methods described herein may provide image-based encryption of cloud data by receiving an image file and using the image file as the basis of a cryptographic element that may be used to encrypt secrets in a cloud data store. The image file may, for example, be located on a social media site, where the file may be accessible indefinitely. The secrets encrypted in the cloud data store may include files and/or a master cryptographic element that may be used to encrypt files in the data store. Systems and methods described herein may save a modified copy of the image file, to be used as a reminder when prompting the user to provide the image file again (such as when the user needs to reset a forgotten password).

The following will provide, with reference to FIGS. 1, 2, and 4-8, detailed descriptions of exemplary systems for image-based encryption of cloud data. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 9 and 10, respectively.

FIG. 1 is a block diagram of exemplary system 100 for image-based encryption of cloud data. As illustrated in this figure, exemplary system 100 may include one or more modules 102 for performing one or more tasks. For example, and as will be explained in greater detail below, exemplary system 100 may also include an identification module 104 that may identify a user account for a cloud data store, where the cloud data store stores one or more secrets to be secured by encryption on behalf of the user account. Exemplary system 100 may additionally include an image module 106 that may receive an image file to be used at least partly to generate a cryptographic element to be used for encrypting the secret, with the cryptographic element capable of being re-created when the image file may be provided again at a later time. Exemplary system 100 may also include a key generation module 108 that may use one or more cryptographic functions to generate the cryptographic element based at least partly on the image file. Exemplary system 100 may additionally include an encryption module 110 that may secure the secret by encrypting the secret using the cryptographic element. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or cloud service 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as data store 120. In one example, data store 120 may be configured to store configured to store personal and/or confidential data belonging to a user or organization. Data store 120 may represent portions of a single database or computing device or a plurality of databases or computing devices. For example, data store 120 may represent a portion of cloud service 206 in FIG. 2, computing system 910 in FIG. 9, and/or portions of exemplary network architecture 1000 in FIG. 10. Alternatively, data store 120 in FIG. 1 may represent one or more physically separate devices capable of being accessed by a computing device, such as cloud service 206 in FIG. 2, computing system 910 in FIG. 9, and/or portions of exemplary network architecture 1000 in FIG. 10.

Figure 2:
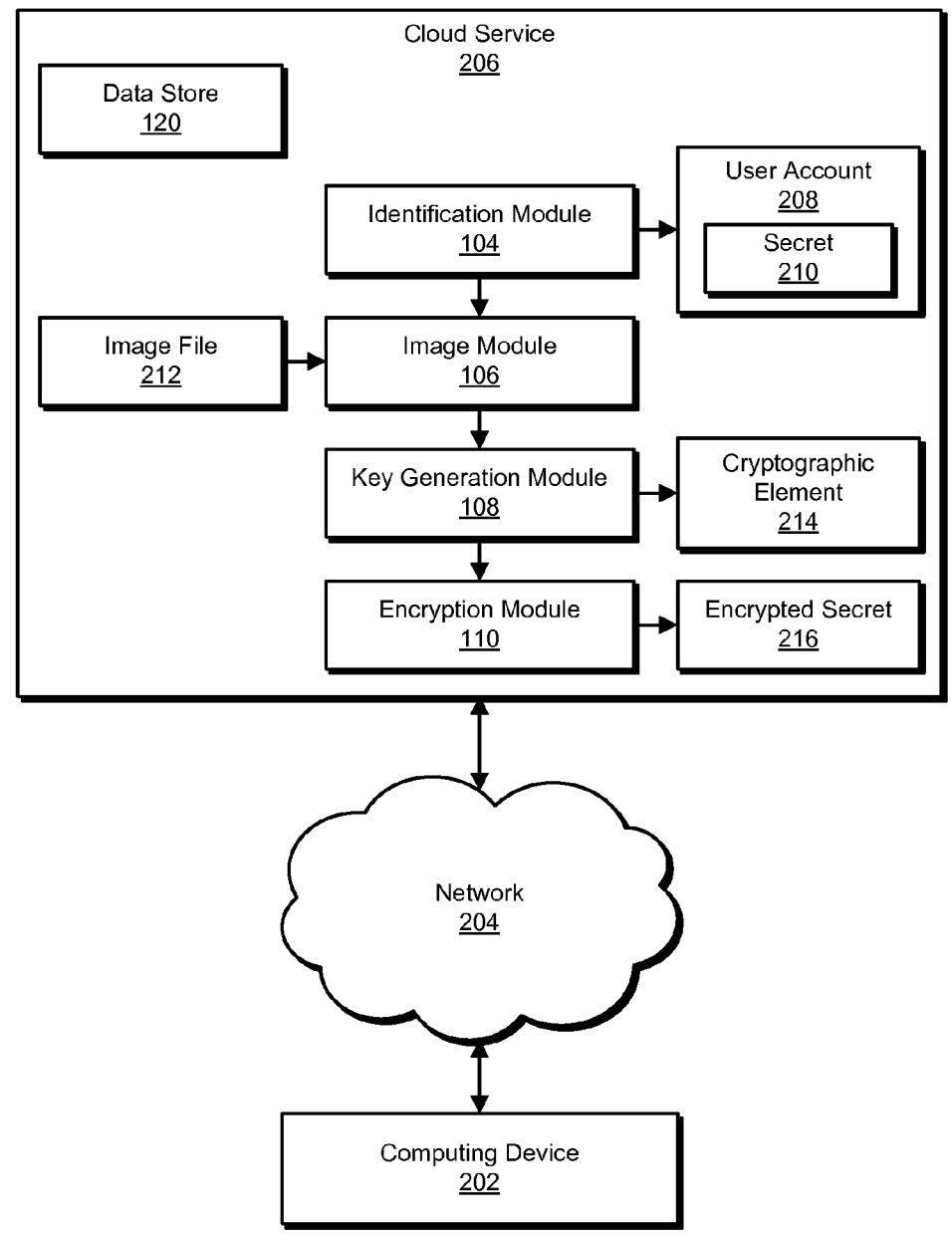
FIG. 2 is a block diagram of an additional exemplary system for image-based encryption of cloud data.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a cloud service 206 via a network 204. In one example, computing device 202 may be programmed with one or more of modules 102 and/or may store all or a portion of the data in data store 120. Additionally or alternatively, cloud service 206 may be programmed with one or more of modules 102 and/or may store all or a portion of the data in data store 120.

In one embodiment, one or more of modules 102 from FIG. 1 may, when executed by at least one processor of computing device 202 and/or cloud service 206, enable computing device 202 and/or cloud service 206 to implement image-based encryption of cloud data. For example, and as will be described in greater detail below, one or more of modules 102 may cause computing device 202 and/or cloud service 206 to implement image-based encryption of cloud data. For example, and as will be described in greater detail below, identification module 104 may identify a user account 208 for a cloud data store 120, where the cloud data store 120 stores at least one secret 210 to be secured by encryption on behalf of user account 208. Image module 106 may receive an image file 212 to be used at least partly to generate a cryptographic element 214 to be used for encrypting secret 210, with cryptographic element 214 capable of being re-created when image file 212 is provided again at a later time. Key generation module 108 may, using one or more cryptographic functions, generate cryptographic element 214 based at least partly on image file 212. Encryption module 110 may secure secret 210 by encrypting secret 210 using cryptographic element 214 to create encrypted secret 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing device.

Cloud service 206 generally represents any type or form of computing device that is capable of storing, comparing, and/or providing data. Examples of cloud service 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between computing device 202 and cloud service 206.

Figure 3:
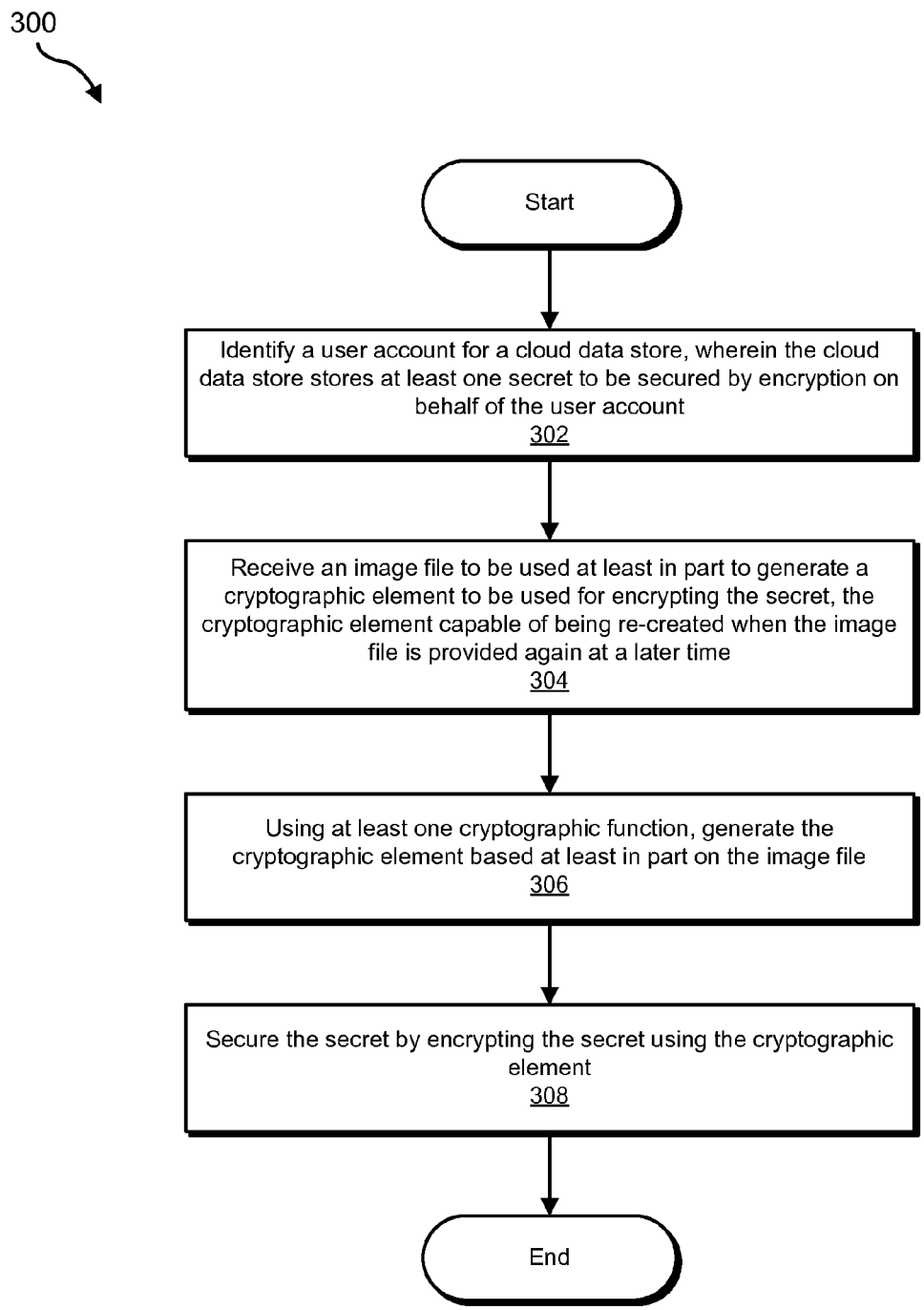
FIG. 3 is a flow diagram of an exemplary method for image-based encryption of cloud data.

FIG. 3 is a flow diagram of an exemplary computer-implemented method 300 for image-based encryption of cloud data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302, one or more of the systems described herein may identify a user account for a cloud data store, in which the cloud data store stores secrets to be secured by encryption on behalf of the user account. For example, identification module 104 may, as part of cloud service 206 in FIG. 2, identify user account 208 for a cloud data store 120 of cloud service 206, where cloud data store 120 stores one or more secrets 210 to be secured by encryption on behalf of user account 208.

As used herein, the term "cloud data store" generally refers to Internet-accessible data storage provided by an organization (i.e., a cloud service provider) to individual or organizational clients (e.g., providing storage as a service). Clients of cloud service providers store data with cloud service providers without needing to identify, configure, or maintain the underlying infrastructure. In some examples, administrative and/or security procedures for data storage may be set and/or implemented by the cloud storage provider. In some examples, the cloud storage provider may store data for multiple distinct entities. In at least one example, the entities that store data with the cloud storage provider may require data security against each other (in order to, e.g., prevent unprivileged access of data across entities), against intruders (e.g., entities not authorized to access data stored within the third-party storage system), and/or one or more administrators of the third-party storage system.

The term "secrets," as used herein, generally refers to any form of structured, semi-structured, or unstructured information a client may want to store in a cloud data store without unauthorized parties accessing the information. Secrets may include, without limitation, data files, program files, emails, documents, messages, databases, database tables, password data, and/or cryptographic keys.

As used herein, the term "user account" generally refers to a user identity associated with a cloud data store. A cloud service provider may require user authentication (e.g., by providing a user name, password, and/or other authentication factors) before granting access to the cloud data store associated with a user account, to add, delete, or modify data in the cloud data store. A cloud service provider may encrypt data in a cloud data store when the data is added to the data store, then decrypt it when accessed by the user. By doing so, the cloud service provider may protect the data from being disclosed to an intruder who obtains unauthorized access to the data store, but not to the cryptographic keys associated with the user account.

Identification module 104 may identify the user account for a cloud data store in a variety of ways. For example, identification module 104 may identify the user account when the user establishes the user account with the cloud service (e.g., using an electronic sign-up form). In another example, identification module 104 may identify the user account when cloud service 206 asks the user to provide an image file to be used as part of a user authentication process, or when resetting a forgotten password.

At step 304, one or more of the systems described herein may receive an image file to be used at least in part to generate a cryptographic element to be used for encrypting the secret. For example, image module 106 may, as part of cloud service 206 in FIG. 2, receive image file 212 to be used at least in part to generate cryptographic element 214 to be used for encrypting secret 210 on behalf of the user who owns user account 208 to create encrypted secret 216. Cryptographic element 214 may be re-created when encrypted secret 216 is to be decrypted, at which time the user may be asked to provide image file 212 again to re-create cryptographic element 214.

In some examples, once the secret is encrypted, the cryptographic element need not be stored with the secret. The cryptographic element may be re-created when the encrypted secret is to be decrypted, at which time the user may provide the image file again. In some examples, the cryptographic element may include a symmetric key. As will be described in greater detail below, in some examples, the cryptographic element may include a public encryption key and a private decryption key. The cloud service may retain the public encryption key to encrypt data that is added to the cloud data store at a later time, but not retain the private decryption key. The user may then provide the image file to re-create the private decryption key when the data is to be decrypted. In this way, the cloud service may encrypt data on behalf of the user as it is added to the cloud data store, but the data may not be decrypted until the user provides the image file again.

Image module 106 may receive the image file in a variety of ways and from any of a variety of sources. In some examples, image module 106 may retrieve the image file from a cloud-based source (e.g., via an application programming interface (API) and/or via a link to the image file). For example, image module 106 may receive the image file by receiving, from a user of the user account for the cloud data store, a link to the image file in a user account that is for a social media service and that is also controlled by the user. In another example, the user of the user account for the cloud data store may provide a link to the image file in a user account for another cloud service that is also controlled by the user. The other cloud service may provide an API that enables users to grant permission to other users or services to access data stored in private storage areas of the user's account. For example, the user may grant permission to the cloud data service to obtain the image file from a folder in a cloud-based data archive service. In another example, the user may upload an image stored on a computing device or on removable storage media, such as a USB flash drive.

As used herein, the term "social media service" generally refers to an Internet-accessible service that allows users to create, share, or exchange information, and in particular to store images in personal user accounts. Examples of social media services include, without limitation, LINKEDIN, TWITTER, FACEBOOK, and/or GOOGLE+. A social media service may provide an application programming interface (API) that enables users to grant permission to other users or services to access data stored in private storage areas of the user's account. The user of a cloud data service may, for example, grant permission to the cloud data service to obtain an image file from a private photo album in the user's social media account. Because the user may be asked to provide the same image file at a later time, the cloud data service may examine and compare image files in the user's social media account to assure that the selected image is sufficiently different from other images in the user's social media account that the user may be able to provide the correct image file at a later time, without confusion.

Figure 4:
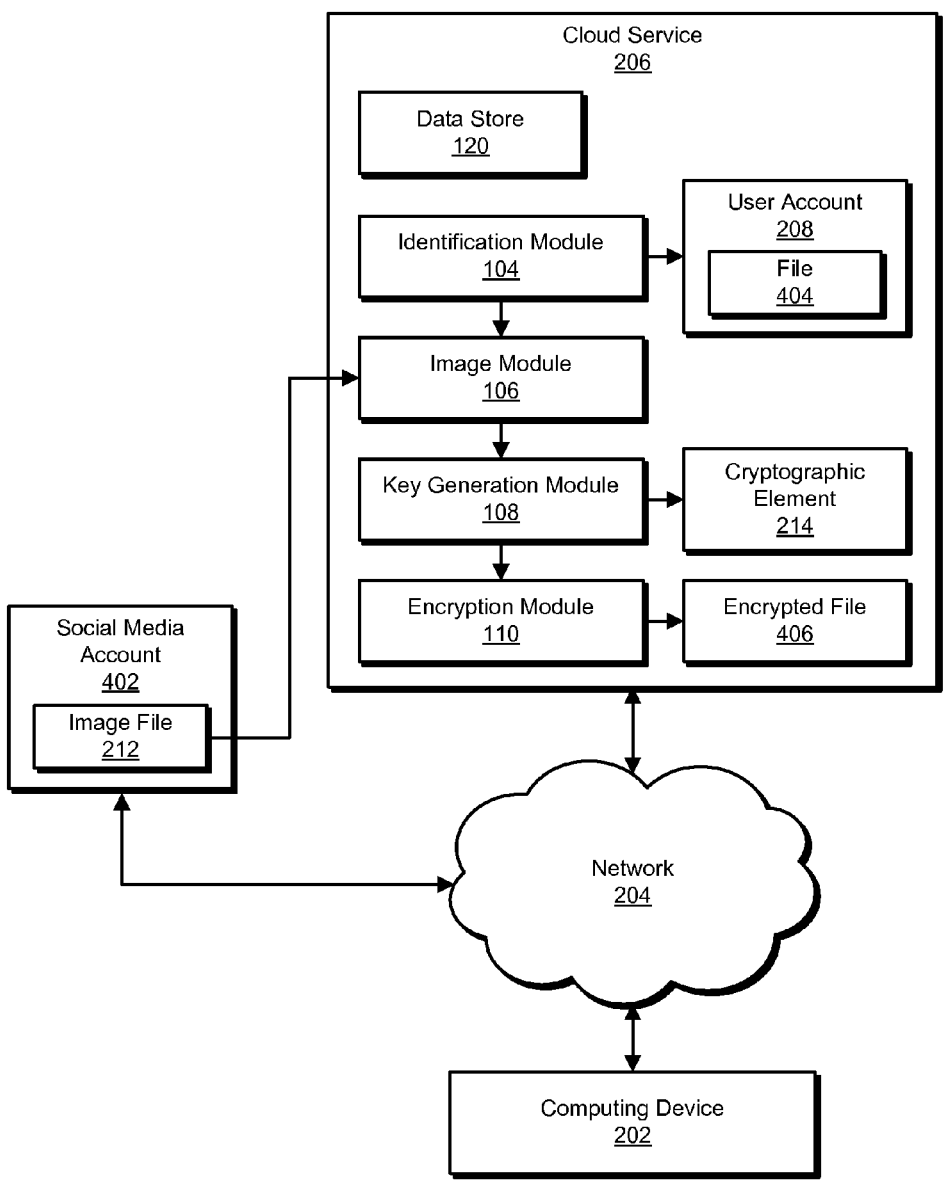
FIG. 4 is a block diagram of an exemplary computing system for account setup for image-based encryption of cloud data.

FIG. 4 is a block diagram of an exemplary computing system 400 for account setup for image-based encryption of cloud data. Exemplary system 400 may include components of system 200 in FIG. 2, such as computing device 202, network 204, and cloud service 206. Exemplary system 400 may also include a social media account 402 that stores image file 212. Image file 212 may, for example, be a photographic image stored in a collection of photographic image files in a user's social media account. After identification module 104 has identified user account 208 as the account containing one or more secrets to be encrypted, image module 106 may prompt the user to provide an image file to be used as the basis of a cryptographic element for encrypting the secrets. The user may provide image file 212 in the user's social media account 402 by providing a link to image file 212.

In one example, image file 212 may include a video file. Although processes for examining and analyzing the content of video files may be more complex than for photographic images, the systems described herein may use the video file to generate a cryptographic element using hashing, content description, and/or metadata tags (explained in greater detail below) in much the same manner as with photographic images. For example, these systems may select a single frame from the video file to use as an image. For example, these systems may select a single frame from the center of the video file. Additionally or alternatively, these systems may analyze multiple frames as candidate images and select the frame whose corresponding cryptographic element demonstrates the highest level of complexity and/or the lowest level of entropy (e.g., by comparing the frames and/or corresponding cryptographic elements to a database of images and/or cryptographic elements and/or by evaluating the cryptographic element with an entropy evaluation function). In some examples, these systems may select multiple frames from the video file and use multiple frames to generate the cryptographic element. In some examples, the systems described herein may analyze the evolution of an image across time within the rendered video file and generate the cryptographic element based on observing movements, paths, and/or changes in identifiable objects across sequential frames.

At step 306, one or more of the systems described herein may use one or more cryptographic functions to generate the cryptographic element based at least in part on the image file. For example, key generation module 108 may, as part of cloud service 206 in FIG. 2, use one or more cryptographic functions to generate cryptographic element 214 based at least in part on image file 212.

The term "cryptographic element," as used herein, generally refers to any value or object capable of being protected or secured from unauthorized access via one or more cryptographic functions. For example, the phrase "cryptographic element" may refer to a cryptographic key used for encryption and/or authentication. In some examples the cryptographic element may include a cryptographic key used with symmetric algorithms for both encryption and decryption. Preventing secrets encrypted using symmetric encryption algorithms from disclosure requires the cryptographic key to remain secret. In some examples, a cryptographic element may include an asymmetric key pair that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair.

Key generation module 108 may generate the cryptographic element based on the image file in a variety of ways. For example, key generation module 108 may generate a cryptographic element consisting of an encryption key that is the result of applying a hash function (such as SHA-256) to the image file. In another example, image module 106 may generate the cryptographic element by selecting at least one metadata tag of the image file. For example, the image file may contain metadata tags indicating where and when the photograph in the image file was created (e.g., "lat="47.7150476" lon="11.7259344" 2013-01-27T08:56:37Z"). Key generation module 108 may use the metadata tags to create an initial value (e.g., "LAT="47.7150476"_LON="11.7259344"_2013-01-27T08:56:37Z") for a password-based encryption algorithm, such as PBKDF2.

In another example, key generation module 108 may use image analysis tools to create a description of content within an image rendered from the image file to be used as an initial value for a password-based encryption algorithm. For example, if the photo is that of the user in front of the Thinking Cup entrance in Boston (located at 165 Tremont St, Boston, Mass.) and partial signs are visible, recognition software may analyze the image and come up with a string describing the content (e.g., "12_MATT_ORANGE_14_DOOR_BLACK_165_GREEN_CUP_25_HUMAN1"). By using metadata tags and/or a description of the from the image file as the basis of a cryptographic element, the cryptographic element may be re-created at a later time even if the image file has been slightly modified (e.g., if the social media service reformats the image file for greater storage efficiency).

In one embodiment, key generation module 108 may generate a cryptographic element that includes a public encryption key for encrypting the secret that is to be stored with the user account in the cloud data store. The cryptographic element may also include a private decryption key to be re-created upon receiving the image file when the secret is to be decrypted. In one embodiment, key generation module 108 may generate a cryptographic element that includes a single symmetric encryption key for both encrypting and decrypting the secret.

At step 308, one or more of the systems described herein may secure the secret by encrypting the secret using the cryptographic element. For example, encryption module 110 may, as part of cloud service 206 in FIG. 2, secure secret 210 in user account 208 by encrypting secret 210 using cryptographic element 214 to create encrypted secret 216.

Encryption module 110 may encrypt the secret using the cryptographic element in a variety of ways. For example, as shown in FIG. 4, the secret may include a file 404 in user account 208. Encryption module 110 may encrypt file 404 using cryptographic element 214 on behalf of the user account to create encrypted file 406, which may then be stored in cloud data store 120 of cloud service 206. File 404 may be decrypted at a later time when the user provides image file 212 again to re-create cryptographic element 214.

As will be described in greater detail below, secret 210 may also include a master cryptographic element used to encrypt and/or decrypt files in the cloud data store. A master cryptographic element may be used with asymmetric key cryptography, where the cloud data service uses a public key to encrypt data added to the cloud data store and a private key to decrypt data when accessed by a user. The private key may be protected from disclosure by encrypting the private key using the cryptographic element created when the user provides the image file. In another example, the master cryptographic element may be used with symmetric key cryptography, where the cloud data service uses a single key to encrypt and decrypt data in the cloud data store.

Figure 5:
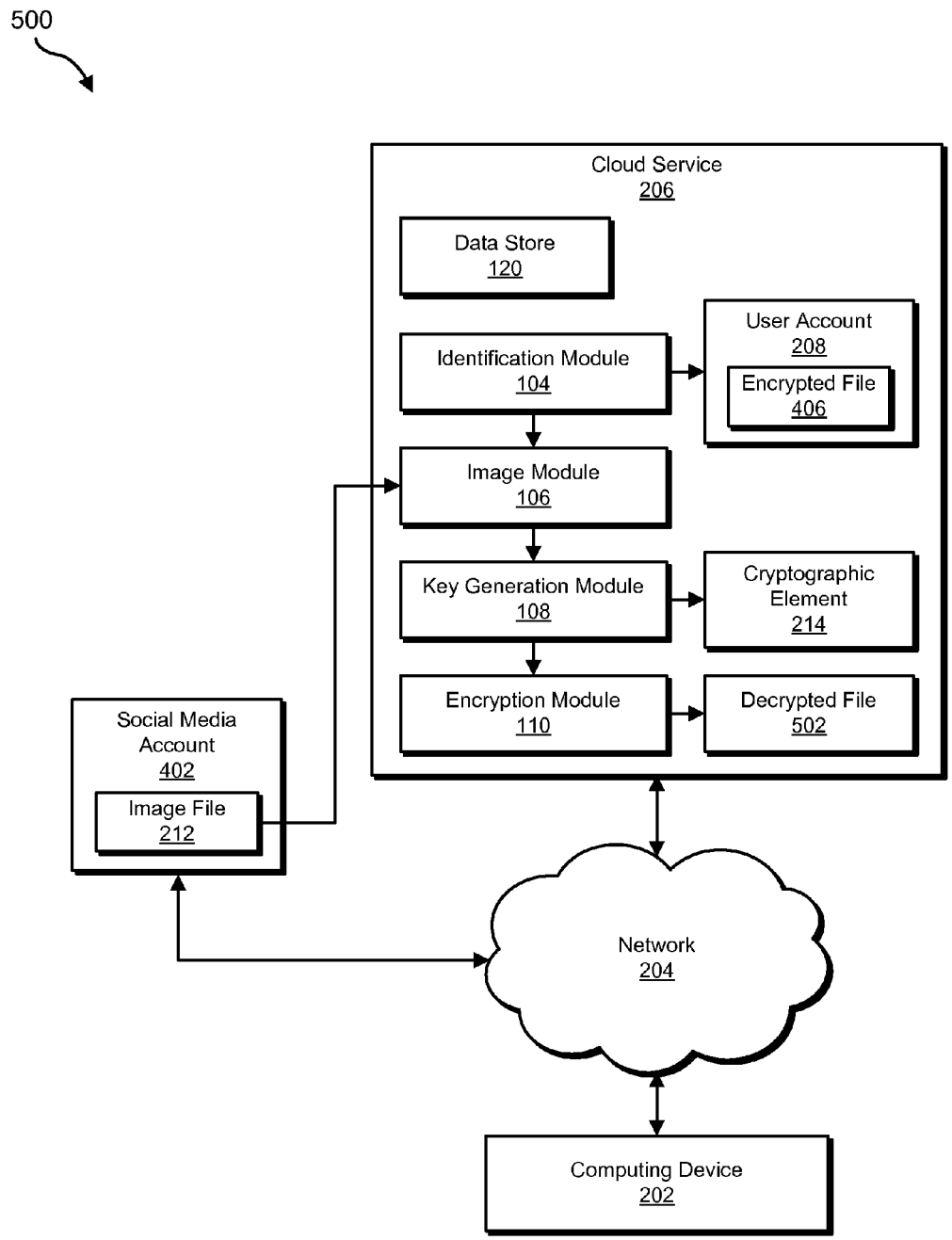
FIG. 5 is a block diagram of an exemplary computing system for decryption of cloud data.

FIG. 5 is a block diagram of an exemplary computing system 500 for decryption of cloud data. System 500 may include components of system 200 in FIG. 2, such as computing device 202, network 204, and cloud service 206. System 500 may also include social media account 402 from system 400 in FIG. 4. Cloud service 206 may receive a request from a user on computing device 202 to access encrypted file 406. To decrypt file 406, encryption module 110, as part of cloud service 206, may request that the user provide image file 212. Key generation module 108 may use image file 212 to re-create cryptographic element 214, which encryption module 110 may use to decrypt encrypted file 406 to create decrypted file 502. Cloud service 206 may then provide decrypted file 502 to the user on computing device 202.

In one embodiment, the secret may include a master cryptographic element where (1) the master cryptographic element includes a private decryption key for decrypting files in the user account that were encrypted using a public encryption key, (2) the master cryptographic element was encrypted using the cryptographic element on behalf of the user account, and (3) the master cryptographic element is to be decrypted at a later time when the image file provided again to re-create the cryptographic element to decrypt the master cryptographic element.

Figure 6:
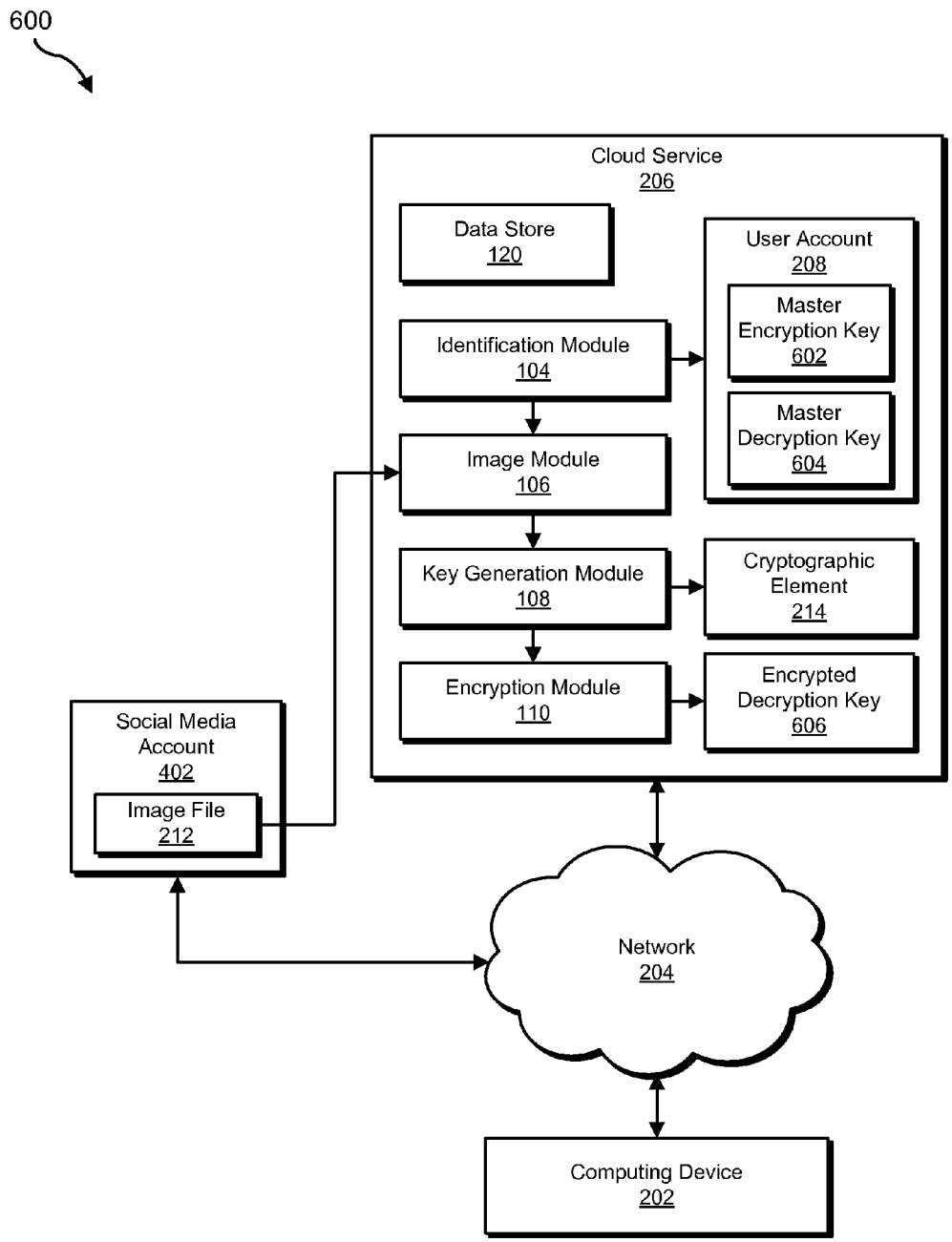
FIG. 6 is a block diagram of an exemplary computing system for master key encryption for cloud data.
Figure 7:
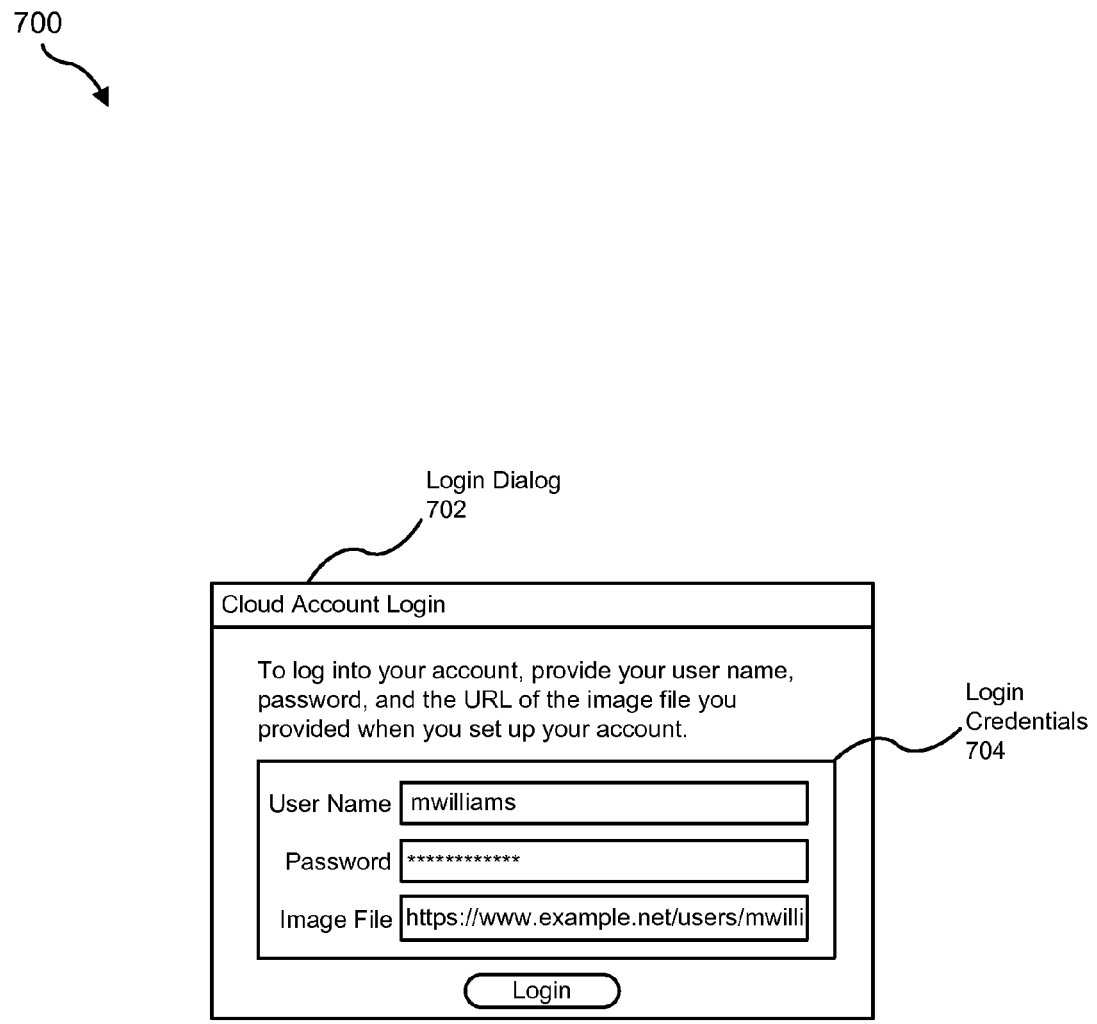
FIG. 7 is a block diagram of an exemplary user interface for user login for image-based encryption of cloud data.

FIG. 6 is a block diagram of an exemplary computing system 600 for master key encryption for cloud data. System 600 may include components of system 200 in FIG. 2, such as computing device 202, network 204, and cloud service 206. System 600 may also include social media account 402 from system 400 in FIG. 4. System 600 may include master encryption key 602 and master decryption key 604, which may be the public encryption key and private decryption key, respectively, from an asymmetric key pair. Image module 106 may request the user of user account 208 to provide image file 212, so key generation module 108 may generate cryptographic element 214, which encryption module 110 may use to encrypt master decryption key 604 to create encrypted decryption key 606. Master key encryption may be advantageous, for example, to provide a way for a user to obtain access to the cloud data store when the user has forgotten the password to the user account. The cloud data service may use multiple techniques for generating cryptographic elements that may be used to decrypt separate copies of the master decryption key. For example, one copy of the master decryption key may be encrypted using a cryptographic element based on the user's user name and password, and another using an encryption key stored on the user's mobile phone. A separate copy of the master decryption key may be encrypted using the image file the user provided when the account was created. If the user forgets their password and/or loses their mobile phone, the cloud service may ask the user to provide the image file again, then use the image file to generate a cryptographic key used to encrypt the second copy of the master decryption key, thereby restoring the user's ability to access decrypted data from the cloud data store.

In some examples, systems described herein may store a copy of the image file, modified so as not to be usable to re-create the cryptographic element, to be used as a prompt to remind the user of the user account of the image file to be provided to re-create the cryptographic element. For example image module 106 may create a thumbnail version of the image file, remove metadata tags, convert the image to black and white, and/or otherwise alter the image so that it remains recognizable to the user, but cannot be used to re-create the cryptographic element using the same processes or algorithms previously used to create the cryptographic element. In this way, cloud service 206 may use the modified image file to remind the user which image file is to be provided to re-create the cryptographic element, without the means for re-creating the cryptographic element being stored with the encrypted data.

In some examples, systems described herein may include providing a prompt to remind the user of the user account of the image file to be provided to re-create the cryptographic element. The prompt may be used, for example, when resetting a forgotten password on the user account. In one example, the reminder may include the modified copy of the image file. In some examples, the prompt may include the modified image file displayed with at least one other image as a security measure to prevent revealing the identity of the image file to an unauthorized party. In another example, the reminder may include a description of the image in the image file. For example, the reminder may include a description of the image that was used to generate the cryptographic element when the cloud service initialized encryption on the user account. In one example, the reminder may include text representing one or more metadata tags of the image file. For example, the reminder may include a comment included in a metadata tag, and/or the date or location the photograph in the image file was taken.

Figure 8:
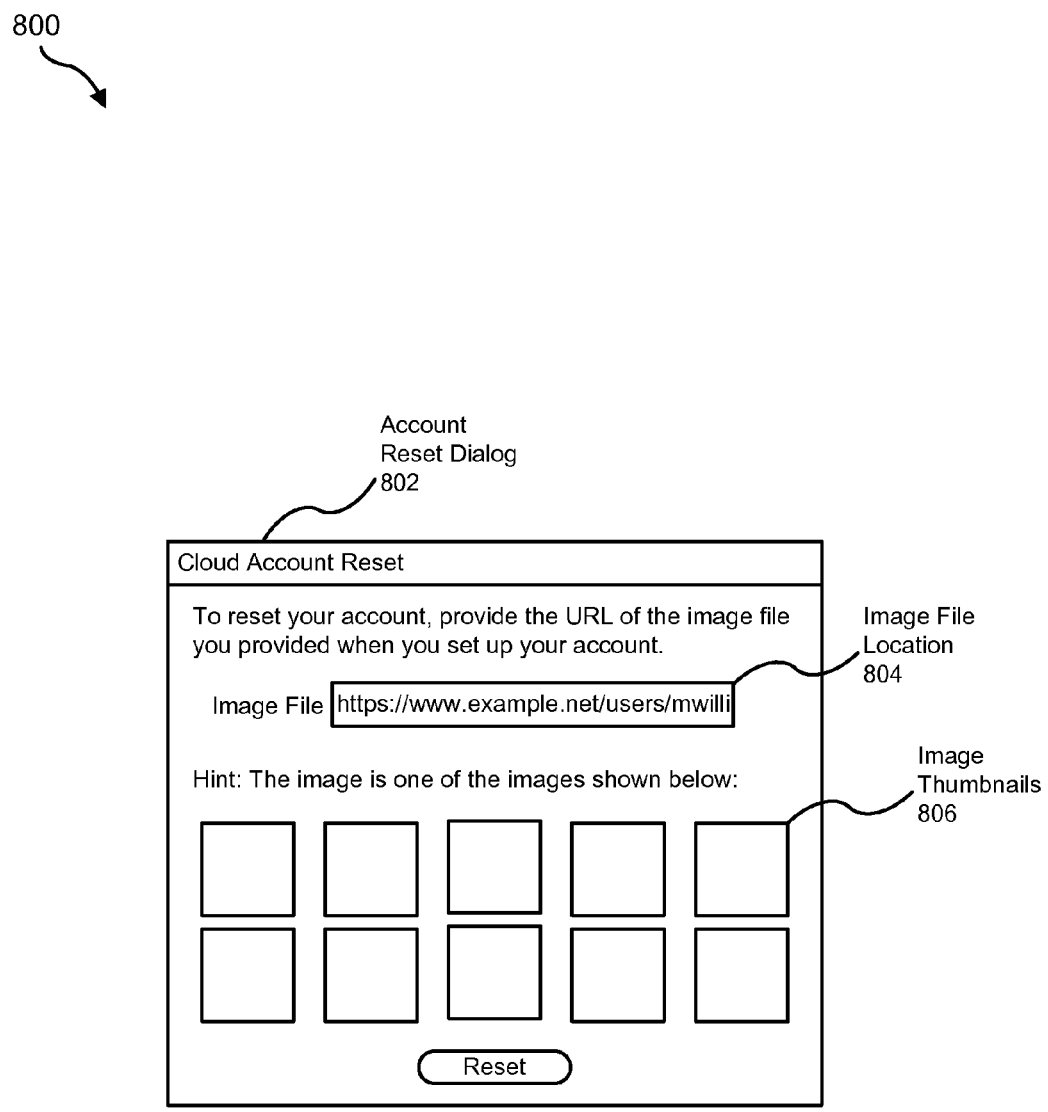
FIG. 8 is a block diagram of an exemplary user interface for account reset for image-based encryption of cloud data.

FIG. 8 is a block diagram of an exemplary user interface 800 for account reset for image-based encryption of cloud data. User interface 800 may include an account reset dialog 802 that asks the user to provide the image file in order to reset the password on the account. User interface 800 may include a field where the user may specify the image file location 804. To remind the user of the image file to be provided, user interface 800 may include several image thumbnails 806 that include a thumbnail version of the image file, as a reminder to the user of which image file the user is to provide. In another example, instead of a field for the user to specify the image file location 804, user interface 800 may include a user interface control for the user to grant permission for the cloud service to access a user account for another cloud service (such as a social media service) that is also controlled by the user. Using an API provided by the other cloud service, the cloud service may provide a mechanism for the user to locate and identify the image file. For example, the cloud service may access the image file using an OAuth standard API and/or a FACEBOOK Graph API.

As described above, systems and methods described herein may provide image-based encryption of cloud data by receiving an image file from the user of the cloud data store, and using the image file as the basis for creating a cryptographic element that may then be used to encrypt secrets in the user's cloud data account. The secrets may include data files or a master cryptographic element used to encrypt the user's files in the cloud data store. The cryptographic element may include a cryptographic key used with symmetric algorithms to both encrypt and decrypt secrets in the cloud data store, or a cryptographic key pair that separately encrypt and decrypt secrets using asymmetric algorithms. The image file may include an image file in a user account that is for a social media service and that is also controlled by the user, and may include a still photographic image or video image.

Systems and methods described herein may save a modified copy of the image file, a description of the image, and/or metadata tags from the image file to be used as a reminder of which image file the user is to provide to re-create the cryptographic element. Systems and methods described herein may also provide an authentication factor that may be used in addition to other factors, such as a user name and password, and which may be used to authenticate the user in the absence of other factors, such as when the user has forgotten the password for the user account.

Figure 9:
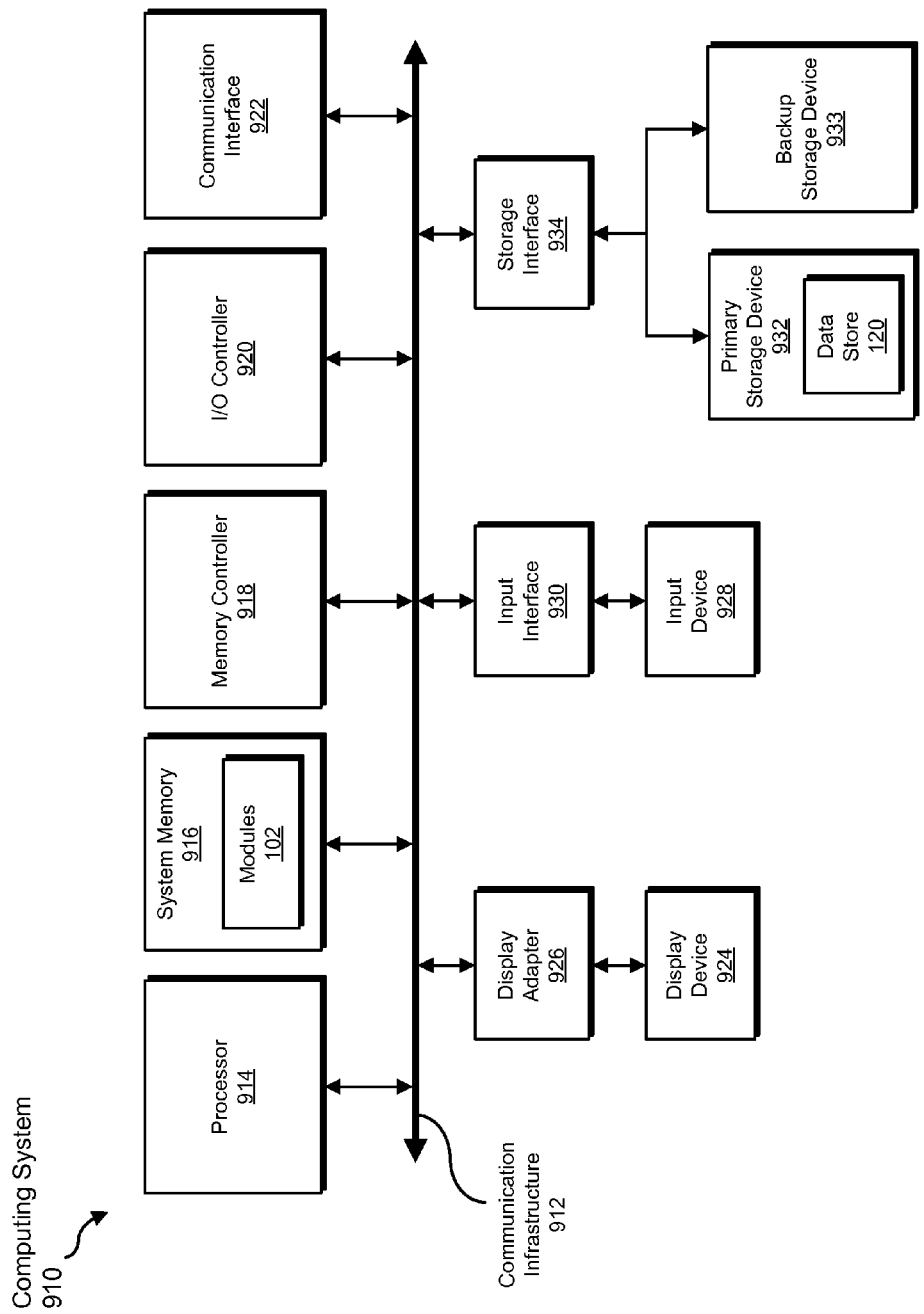
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, data store 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
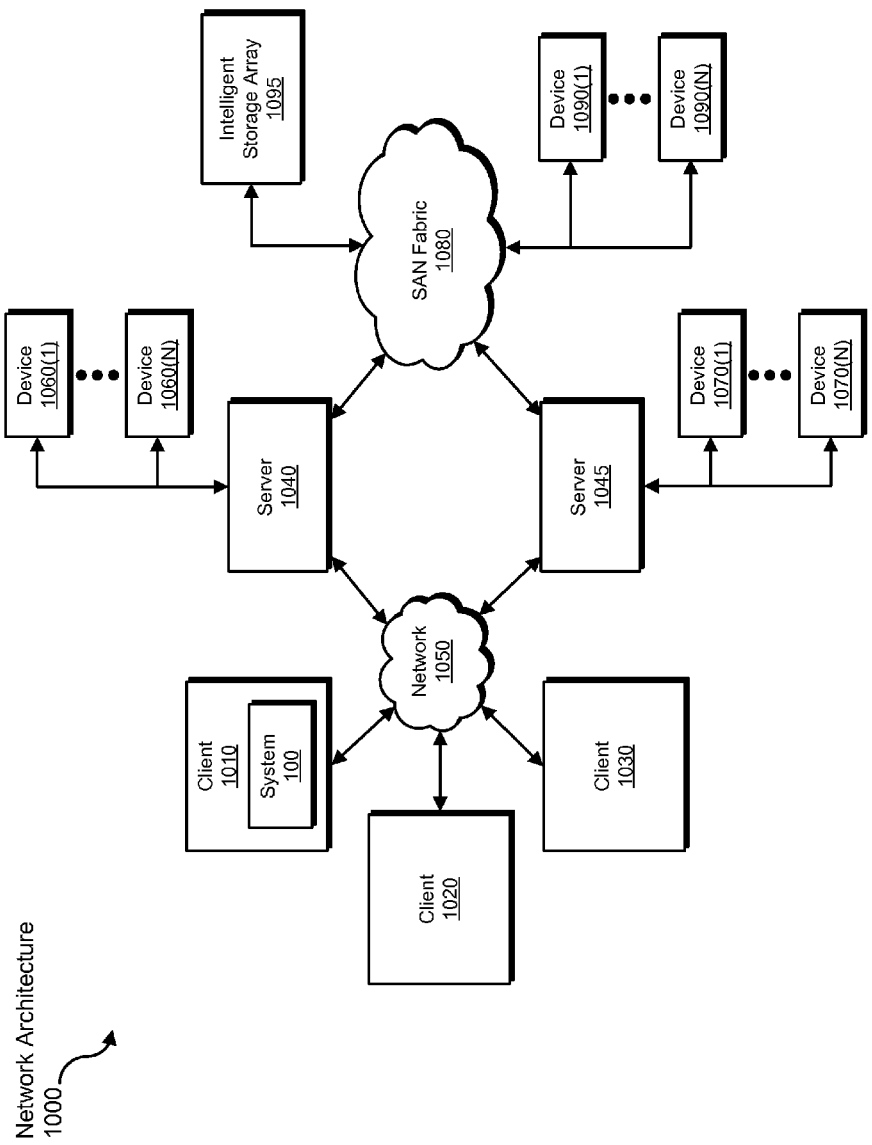
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for image-based encryption of cloud data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive image data to be transformed, transform the image data, output a result of the transformation to generate a cryptographic element, use the result of the transformation to encrypt secrets, and store the result of the transformation to protect the secrets from unauthorized disclosure. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for image-based encryption of cloud data, at least a portion of the method being performed by a computing device comprising at least one processor, the method comprising:
   identifying, by the computing device, a user account for a cloud data store, wherein the cloud data store stores at least one secret to be secured by encryption on behalf of the user account, wherein the secret comprises a master cryptographic element comprising a decryption key for decrypting files in the user account that were previously encrypted using an encryption key;
   receiving, by the computing device, an image file to be used at least in part to generate a cryptographic element to be used for encrypting the secret, the cryptographic element capable of being re-created when the image file is provided again at a later time;
   using at least one cryptographic function, generating, by the computing device, the cryptographic element based at least in part on the image file;
   securing, by the computing device, the secret on behalf of the user account by encrypting the secret using the cryptographic element, wherein the secret is to be decrypted at a later time when the image file is provided again to re-create the cryptographic element to decrypt the secret to re-create the master cryptographic element.

2. The computer-implemented method of claim 1, wherein the cryptographic element comprises:
   a public encryption key stored with the user account in the cloud data store for encrypting the secret;
   a private decryption key to be re-created upon receiving the image file when the secret is to be decrypted.

3. The computer-implemented method of claim 1, wherein the secret comprises a file encrypted using the cryptographic element on behalf of the user account, the file to be decrypted at a later time when the image file is provided again to re-create the cryptographic element.

4. The computer-implemented method of claim 1, wherein receiving the image file comprises:
   receiving permission to obtain the image file from a private photo album in the user account;
   determining that the image file is different from other images in the private photo album.

5. The computer-implemented method of claim 1, wherein receiving the image file comprises receiving, from a user of the user account, a link to the image file in a user account that is for a social media service and that is also controlled by the user.

6. The computer-implemented method of claim 1, wherein generating the cryptographic element comprises creating a description of content within an image rendered from the image file.

7. The computer-implemented method of claim 1, wherein generating the cryptographic element comprises selecting at least one metadata tag of the image file.

8. The computer-implemented method of claim 1, further comprising storing a copy of the image file, modified so as not to be usable to re-create the cryptographic element, to be used as a prompt to remind a user of the user account of the image file to be provided to re-create the cryptographic element.

9. The computer-implemented method of claim 8, wherein a user of the user account provides the image file in response to the prompt at least in part to re-create the cryptographic element so as to recover the ability to decrypt the secret after regaining access to the user account.

10. The computer-implemented method of claim 8, wherein the prompt comprises the modified image file displayed with at least one other image, so as to test the user's ability to identify a correct image file to be provided.

11. The computer-implemented method of claim 8, further comprising providing the prompt to remind the user of the user account of the image file to be provided to re-create the cryptographic element, the reminder comprising at least one of:
   a modified copy of the image file;
   a description of content within an image rendered from the image file;
   text representing at least one metadata tag of the image file.

12. The computer-implemented method of claim 1, wherein the image file comprises a video file.

13. A system for image-based encryption of cloud data, the system comprising:
   an identification module, stored in memory, that identifies a user account for a cloud data store, wherein the cloud data store stores at least one secret to be secured by encryption on behalf of the user account, wherein the secret comprises a master cryptographic element comprising a decryption key for decrypting files in the user account that were previously encrypted using an encryption key;
   an image module, stored in memory, that receives an image file to be used at least in part to generate a cryptographic element to be used for encrypting the secret, the cryptographic element capable of being re-created when the image file is provided again at a later time;
   a key generation module, stored in memory, that uses at least one cryptographic function to generate the cryptographic element based at least in part on the image file;
   an encryption module, stored in memory, that secures the secret on behalf of the user account by encrypting the secret using the cryptographic element, wherein the secret is to be decrypted at a later time when the image file is provided again to re-create the cryptographic element to decrypt the secret to re-create the master cryptographic element;
   at least one physical processor configured to execute the identification module, the image module, the key generation module, and the encryption module.

14. The system of claim 13, wherein the cryptographic element comprises:
   a public encryption key stored with the user account in the cloud data store, for encrypting the secret;
   a private decryption key to be re-created upon receiving the image file when the secret is to be decrypted.

15. The system of claim 13, wherein the secret comprises a file encrypted using the cryptographic element on behalf of the user account, the file to be decrypted at a later time when the image file is provided again to re-create the cryptographic element.

16. The system of claim 13, wherein the image module received the image file by:
   receiving permission to obtain the image file from a private photo album in the user account;
   determining that the image file is different from other images in the private photo album.

17. The system of claim 13, wherein the image module receives the image file by receiving, from a user of the user account, a link to the image file in a user account that is for a social media service and that is also controlled by the user.

18. The system of claim 13, wherein the key generation module generates the cryptographic element by creating a description of content within an image rendered from the image file.

19. The system of claim 13, wherein the key generation module generates the cryptographic element by selecting at least one metadata tag of the image file.

20. A non-transitory computer-readable medium comprising one or more computer-readable instructions that, when executed by at least one processor of a computing device, cause the computing device to:

identify a user account for a cloud data store, wherein the cloud data store stores at least one secret to be secured by encryption on behalf of the user account, wherein the secret comprises a master cryptographic element comprising a decryption key for decrypting files in the user account that were previously encrypted using an encryption key;

receive an image file to be used at least in part to generate a cryptographic element to be used for encrypting the secret, the cryptographic element capable of being re-created when the image file is provided again at a later time;

using at least one cryptographic function, generate the cryptographic element based at least in part on the image file;

secure the secret on behalf of the user account by encrypting the secret using the cryptographic element, wherein the secret is to be decrypted at a later time when the image file is provided again to re-create the cryptographic element to decrypt the secret to re-create the master cryptographic element.

\* \* \* \* \*